Feb. 25, 1958     D. H. GOODWILLIE ET AL     2,824,411
METHOD OF APPLICATION OF WATER-SOLUBLE CARBOHYDRATE
TO HEATED ANNEALED GLASS
Original Filed March 20, 1948

INVENTORS
David H. Goodwillie, deceased,
by Commerce National Bank of Toledo, Executor,
and Wilbur F. Brown
BY Nobbe & Swope
ATTORNEYS

United States Patent Office 2,824,411
Patented Feb. 25, 1958

2,824,411

METHOD OF APPLICATION OF WATER-SOLUBLE CARBOHYDRATE TO HEATED ANNEALED GLASS

David H. Goodwillie, deceased, late of Toledo, Ohio, by Commerce National Bank of Toledo, Toledo, Ohio, executor, and Wilbur F. Brown, Toledo, Ohio, assignors to Libbey-Owens-Ford Glass Company, Toledo, Ohio, a corporation of Ohio Continuation of application Serial No. 16,088, March 20, 1948. This application December 24, 1952, Serial No. 327,754

4 Claims. (Cl. 49—77)

The present invention relates to the protection of articles, and more particularly to an improved coating and technique for protecting the surfaces of newly fabricated glass sheets or plates from staining, weathering, and/or scratching, especially under storage conditions.

This application is a continuation of a copending application of David H. Goodwillie and Wilbur F. Brown, Serial No. 16,088, filed March 20, 1948, now abandoned.

Most commercial sheet and plate glasses are soda-lime-silica glasses and considerable difficulty has been experienced in the past because of the tendency of such glass to "weather" and "stain," particularly after it has been stored for any length of time under conditions that are not nearly ideal as to humidity, temperature, etc.

This is due to the presence of an alkaline film on the surface of the glass. Such a film has a great affinity for moisture, causing it to combine with water in the air to form a strong alkaline solution. This solution has a corroding action on the sheet surfaces and causes them to "weather"; that is, to fade and lose their highly polished lustre. The solution also causes "staining" of the glass, and this usually results when the glass plates or sheets have to be stored for any length of time under ordinary industrial storage conditions.

The alkaline surface film itself may develop in different ways. For example, when soda-lime-silica glasses are heated they develop or "sweat out" a thin but strongly alkaline film on their surfaces. Consequently, this sort of film is developed on glass during the annealing process and for this reason, unless it is removed or neutralized, it will be present on a newly formed glass sheet or ribbon when such a sheet or ribbon emerges from the annealing leer and is ready to be cut up into sheets or panes.

Even when the surface of a glass sheet has been made neutral by washing, acid treating, or by grinding and polishing with acid in the polishing material, a thin film of moisture in contact with such a glass surface over a period of time (a common cause is sweating of the glass) brings out the alkalis in the glass and will eventually cause staining.

In the past a great deal of effort has been expended in an effort to effectively prevent weathering and staining of the glass and to protect it while in storage. For this reason, in the present commercial production of sheet and plate glass, water and acid washing devices are made a part of the standard equipment for the purpose of removing and/or neutralizing the alkaline film, and the glass sheets or plates are packed or stored with sheets of special absorbent paper between their adjacent surfaces.

Such treatment, however, involves considerable expense, and is both time, space, and labor consuming. Moreover, it is effective only when the glass is not stored for any great period. Even after thorough washing with water and acid, or, in the case of plate glass, polishing with acid in the rouge, and protection with paper, glass in storage will "stain," particularly at any part of its surface that is out of contact with the absorbent paper protecting sheet.

It is an aim of the present invention to provide an entirely new method of protecting glass sheets from stain, weathering and scratches, and which will eliminate the necessity for washing, acid dipping and the use of paper or similar protective means.

Briefly stated, this purpose is accomplished in a preferred form of the invention by first buffing the sheet of glass to remove surface dirt and then coating both sides thereof with a skin-tight protective coating, preferably of a water-soluble carbohydrate or saccharid such as glucose or dextrin.

Another object is the provision of a coating of the above character that is long lived and gives adequate protection, while at the same time being inert to the glass and readily removable therefrom when it has served its purpose.

Another object is to provide such a protective coating that can be easily applied, that dries quickly, is sufficiently transparent to permit inspection of the glass, which does not interfere with the cutting of the glass into smaller plates or panes, and which does not adhere to similar coatings on other sheets with which the coated sheet is stacked.

Other objects and advantages of the invention will become more apparent during the course of the following description, when taken in connection with the accompanying drawings.

In the drawings, wherein like numerals are employed to designate like parts throughout the same:

Practically all present day commercial sheet or window glass is flat drawn into a continuous ribbon, which is then passed into and through an annealing leer within which the temperature of the glass is reduced to a point at which it can be readily handled. After leaving the leer the ribbon of glass passes into a capping area where it is cut into sections that are subsequently divided into sheets or panes of commercial size.

Figure 1:
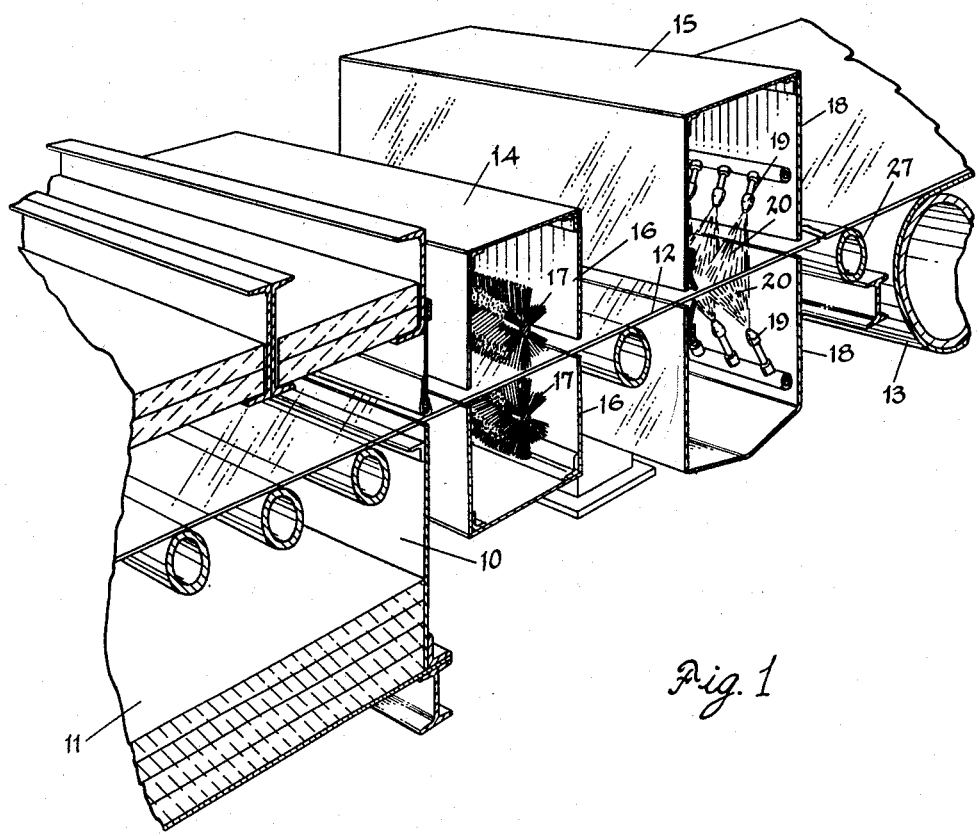
Fig. 1 is a longitudinal, sectional perspective view showing one way in which the coating of the invention may be applied to opposite surfaces of a ribbon of glass as it emerges from an annealing leer.
Figure 3:
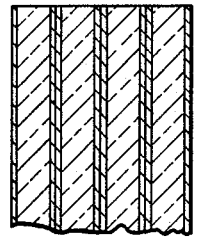
Fig. 3 is a fragmentary sectional view through a stack of glass sheets provided with the coating of the invention.

Referring now more particularly to the drawings, there is shown in Fig. 1 the exit end 10 of an annealing leer 11 through which a continuous ribbon of glass 12 is constantly moving. From the exit end of the leer the ribbon 12 passes onto a capping table 13 which is provided with suitable equipment (not shown) for scoring and breaking the ribbon into sections or blanks of predetermined size.

As indicated above, it has heretofore been necessary to acid treat and thoroughly wash the glass shortly after it emerged from the leer to protect it from weathering and staining and to remove surface dirt. For this purpose it was customary to dip the capped glass sections or to pass them through an extensive acid treating and washing machine as soon as they left the capping table and before these sections could be inspected and cut up into commercial sizes. Even this treatment did not provide complete protection for an extended period.

According to the present invention, however, the necessity for expensive and space consuming acid treating and washing machines is entirely eliminated and, by means of a relatively simple and inexpensive apparatus, the surface dirt may first be buffed or brushed from the glass, and the clean surface then provided with an enduring and adequately protective coating, before the glass ribbon reaches the capping area.

One way of accomplishing this is shown in Fig. 1 where there is interposed, between the exist end of a leer 11 and a capping table 13, a buffing device 14 and a spray applying apparatus 15. The device 14 preferably includes a sheet metal housing 16 within which are positioned a pair of brushes 17 mounted to contact opposite surfaces of the glass ribbon 12. The brushes can be driven in any suitable manner in a direction opposite to the movement of the ribbon to effectively remove surface dirt therefrom. To insure removal of the dirt the bristles of the brushes may be spirally arranged and suitable dirt exhausting means may be provided for the casing or housing 16.

The spray mechanism 15 is positioned beyond the buffing device and comprises a housing 18 within which are mounted suitable spray pipes or nozzles 19 for directing sprays of coating solution 20 upon opposite surfaces of the advancing ribbon 12. The amount of coating sprayed on the glass and consequently the thickness of coating can be controlled in any well known manner. Also, a plurality of layers may be applied to build up a coat of the required thickness, and of course other means of applying the solution can be used if desired.

Figure 2:
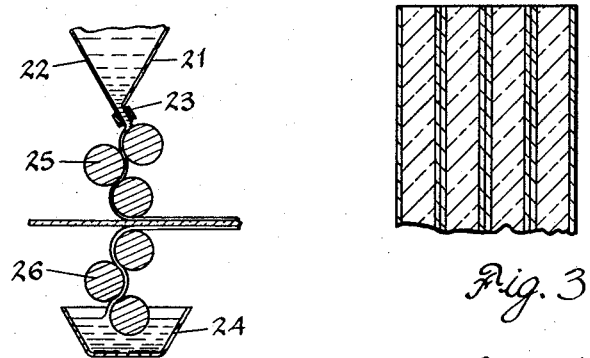
Fig. 2 is a section through a modified form of apparatus for applying the coating.

For example, there has been shown in Fig. 2 a modified form of apparatus for coating the glass. With this device a supply of coating solution 21 is contained in the hopper 22 having a controllable discharge orifice 23, and a similar supply of solution is contained in an open trough 24 therebeneath. The solution from the hopper 22 flows upon a series of rolls 25, while that from the trough 24 is picked up by a second series of rolls 26. By causing the ribbon of glass 12 to pass between the lower roll of the series 25 and the upper roll of the series 26 layers of the solution will be progressively deposited in uniform coatings on opposite surfaces of the glass.

The glass ribbon 12 as it emerges from the leer is usually at a temperature ranging from 100° to 250° F., depending on the thickness of the ribbon and the particular conditions under which it has been formed and annealed. At this time the newly formed ribbon is perfectly clean except for dust and similar surface dirt that it has picked up in the leer, and this will be completely removed by the buffing rolls or brushes 17. The clean glass is then immediately sprayed with the coating solution which serves to maintain its surfaces in their original state during subsequent operations and until the glass is ready to be sold or used.

As explained above, we treat the glass for protective purposes at this point in a manner that is entirely different from prior practice. In other words, instead of merely removing the alkaline film from the glass surface, or neutralizing it with acid, we completely protect the glass surface from adverse influences by covering it with a skin-tight coating which adequately protects the surface without interfering with the cutting or other processing of the glass ribbon.

For this purpose we prefer to use a solution of a water-soluble carbohydrate or saccharid. Both water-soluble starches and sugars can be used, or partially hydrolized starches such as dextrin. By way of example only, a dilute solution of dextrin or glucose gives very good results. The consistency of the solution will depend largely on the manner in which it is to be applied, the thickness of coating desired, and the degree of transparency.

A very satisfactory solution can be made from one pound of dextrin or glucose dissolved in 1000 gallons of water with enough muriatic acid to give a solution that is neutral or slightly on the acid side. Obviously, other ingredients can be added to the solution for various purposes, and a vehicle other than water may be employed to give faster drying if desired so long as it does not injuriously affect the glass surface.

Coatings from .001 to .003 inch thick will give adequate protection from weathering and staining, will be sufficiently transparent to allow inspection of the glass for defects, and will permit the coated glass to be cut with regular cutting equipment. However, somewhat thicker coatings can be used when greater protection from scratching and abrasion is desired, without seriously interfering with the other good qualities of the material. In addition to added thickness, further protection can be obtained by using a filler such as wood flour or other protective material in the solution. Or, when it is desired to give further insurance against the coated surfaces sticking together, finely divided wood flour, or other powdered material can be dusted onto the coated surface.

Dilute solutions of water-soluble carbohydrates will dry quickly into a protective coating when applied to glass at the temperatures at which it emerges from the leer, and it is desirable to maintain the coated glass out of contact with the supporting rolls until the coating has set. For this reason the glass ribbon in Fig. 1 has been shown as broken away between the coating apparatus and the next supporting roll 27. This roll 27 should be spaced from the spray apparatus a sufficient distance to permit the coating to dry before reaching it and this distance will vary somewhat with the concentration of the coating solution, volatility of the vehicle, and so forth.

In its preferred form the coating of the invention is transparent, tightly adherent to the glass, and water-soluble. Because of this, the coated glass can be handled, examined and cut in the same way as uncoated glass, and yet will be fully protected against weathering and staining. The coating may be left in place as long as it appears desirable to do so and, in some cases it may be practicable to leave it in place until after the glass has actually been installed in a window or other glazed opening. In any event, whenever it is desired to remove it, this can be done by simply washing with clear water.

While the invention has been specifically described in connection with the coating of a continuous glass ribbon as it emerges from the leer, it will be apparent that it will be equally applicable wherever glass has been heated sufficiently to cause an alkaline film to sweat out on the glass surface. In fact, as explained above, the invention is also applicable to the protection of glass surfaces that are neutral, such as ground and polished plate glass, because in this case too, it preserves the original condition of the surface and so prevents the presence of water bringing out the alkalis that might subsequently combine with moisture in the air to cause "staining" or "weathering."

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

We claim:

1. A method of providing a temporary protective coating upon a newly formed continuous sheet of glass, comprising passing the newly formed sheet into and through an annealing zone and after the sheet has been annealed, but while it is still in a heated condition, applying to opposite surfaces of said sheet across its entire width as it travels forwardly a dilute solution of a water-soluble carbohydrate, and drying said solution to form upon said sheet a transparent, readily removable coating coextensive with the edges thereof.

2. A method of providing a temporary protective coating upon a newly formed continuous sheet of glass, comprising passing the newly formed sheet into and through an annealing zone and after the sheet has been annealed, but while it is still in a heated condition, applying to opposite surfaces of said sheet across its entire width as it travels forwardly a dilute solution of glucose, and drying said solution to form upon said sheet a transparent, readily removable coating coextensive with the edges thereof.

3. A method as defined in claim 1 in which the coating material is a dilute solution of dextrin.

4. A method of providing a temporary protective coating upon a newly formed sheet of glass, comprising passing the newly formed sheet into and through an annealing zone and, after the sheet has been annealed but while it is still in a heated condition, applying to opposite surfaces of said sheet as it travels forwardly a dilute solution of a water-soluble carbohydrate, and drying said solution to form upon said sheet a transparent, readily removable coating.

References Cited in the file of this patent

UNITED STATES PATENTS

| | | |
|---|---|---|
| 284,659 | Oudin | Sept. 11, 1883 |
| 632,014 | Hackelberg | Aug. 29, 1899 |
| 2,376,743 | Wendt | May 22, 1945 |